(12) United States Patent
Takasu et al.

(10) Patent No.: US 10,154,081 B2
(45) Date of Patent: Dec. 11, 2018

(54) CONTROL SYSTEM, AND INFORMATION PROCESSING DEVICE

(71) Applicant: Seiko Epson Corporation, Tokyo (JP)

(72) Inventors: Kazuhiro Takasu, Shiojiri (JP); Koichiro Tsutsumi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 110 days.

(21) Appl. No.: 14/432,338

(22) PCT Filed: Oct. 4, 2013

(86) PCT No.: PCT/JP2013/005946
§ 371 (c)(1),
(2) Date: Mar. 30, 2015

(87) PCT Pub. No.: WO2014/057646
PCT Pub. Date: Apr. 17, 2014

(65) Prior Publication Data
US 2015/0295997 A1 Oct. 15, 2015

(30) Foreign Application Priority Data
Oct. 11, 2012 (JP) ................................ 2012-225864

(51) Int. Cl.
*H04L 29/08* (2006.01)
*G07G 1/12* (2006.01)
(Continued)

(52) U.S. Cl.
CPC ............ *H04L 67/10* (2013.01); *G06F 3/1203* (2013.01); *G06F 3/126* (2013.01); *G06F 3/128* (2013.01); *G06Q 20/202* (2013.01); *G06Q 20/209* (2013.01); *G07G 1/0009* (2013.01); *G07G 1/0018* (2013.01); *G07G 1/0081* (2013.01); *G07G 1/12* (2013.01); *G07G 1/14* (2013.01)

(58) Field of Classification Search
CPC .. H04L 41/00; H04N 5/2252; H04N 1/00474; G06F 17/30864; G06F 1/3225; G06F 15/16
USPC .......................... 709/203, 223, 227; 700/276
See application file for complete search history.

(56) References Cited

U.S. PATENT DOCUMENTS 6,415,341 B1 7/2002 Fry, Sr. et al.
6,466,982 B1 10/2002 Ruberg
(Continued)

FOREIGN PATENT DOCUMENTS

JP 63-163598 A 7/1988
JP 05-073769 A 3/1993
(Continued)

*Primary Examiner* — Tesfay Yohannes
(74) *Attorney, Agent, or Firm* — Foley & Lardner LLP (57) ABSTRACT

Appropriate use of a device by each terminal is enabled based on plural terminals being able to use the device.
A control system 1 has a first tablet terminal 101 (terminal) that runs a web browser; a device DV that outputs data input to the web browser, or to which data output from the web browser is input; and a printer 11 including a device communication unit that communicates device input/output data with the device,
a terminal communication unit that communicates the device input/output data with the terminal, and a device management unit 20d that manages the relationship between the first tablet terminal 101 and the device DV.

10 Claims, 6 Drawing Sheets

(51) Int. Cl.
*G07G 1/14* (2006.01)
*G06F 3/12* (2006.01)
*G06Q 20/20* (2012.01)
*G07G 1/00* (2006.01)

(56) References Cited

U.S. PATENT DOCUMENTS

| | | |
|---|---|---|
| 7,720,710 B2 | 5/2010 | Morrison |
| 8,622,840 B2* | 1/2014 | Suzuki .................... A63F 13/12 |
| | | 463/30 |
| 2003/0093670 A1 | 5/2003 | Matsubayashi et al. |
| 2004/0044667 A1 | 3/2004 | Mahany et al. |
| 2005/0021721 A1* | 1/2005 | Takahashi .......... H04N 1/00204 |
| | | 709/223 |
| 2005/0021785 A1 | 1/2005 | Nakaji |
| 2005/0071746 A1 | 3/2005 | Hart et al. |
| 2007/0109561 A1* | 5/2007 | Suzue ................ H04N 1/00408 |
| | | 358/1.1 |
| 2008/0077975 A1* | 3/2008 | Sugauchi ................ G06F 21/31 |
| | | 726/4 |
| 2008/0130861 A1* | 6/2008 | McLarty ........... H04M 3/42255 |
| | | 379/211.02 |
| 2009/0198818 A1* | 8/2009 | Kamei ................ H04L 41/0803 |
| | | 709/227 |
| 2010/0185951 A1* | 7/2010 | Nichols ............... H04L 65/4015 |
| | | 715/738 |
| 2010/0287301 A1* | 11/2010 | Kalmstrom ........... G06F 17/211 |
| | | 709/233 |
| 2011/0320297 A1 | 12/2011 | Takeuchi |
| 2012/0233006 A1 | 9/2012 | St George et al. |
| 2012/0239830 A1* | 9/2012 | Sugimura ................ G06F 3/14 |
| | | 710/29 |
| 2012/0303763 A1* | 11/2012 | Duggal .................. G06Q 10/10 |
| | | 709/219 |
| 2012/0327309 A1* | 12/2012 | Ikeda ................... H04N 5/4403 |
| | | 348/734 |
| 2013/0007290 A1* | 1/2013 | Yang ................... H04L 12/6418 |
| | | 709/227 |
| 2014/0052607 A1* | 2/2014 | Park ..................... G06Q 40/025 |
| | | 705/38 |
| 2015/0308707 A1* | 10/2015 | Tanaka ................ F24F 11/0086 |
| | | 700/276 |
| 2015/0310227 A1* | 10/2015 | Ishida ..................... G06F 21/31 |
| | | 726/28 |
| 2015/0316281 A1* | 11/2015 | Yabuta ...................... F24F 1/32 |
| | | 700/276 |

FOREIGN PATENT DOCUMENTS

| | | |
|---|---|---|
| JP | 2002-251674 A | 9/2002 |
| JP | 2003-116181 A | 4/2003 |
| JP | 2009-086976 A | 4/2009 |
| JP | 2012-008674 A | 1/2012 |
| JP | 2012-084171 A | 4/2012 |

* cited by examiner

| DEVICE NAME | CONNECTION | USED-BY TERMINAL |
|---|---|---|
| SCANNER | BLUETOOTH/LINK 1 | FIRST TABLET TERMINAL |
| READER | USB/PORT 1 | SECOND TABLET TERMINAL |
| DISPLAY | USB/PORT 2 | NOT USED |
| CASH | SERIAL/PORT 3 | NOT USED |

CONTROL SYSTEM, AND INFORMATION PROCESSING DEVICE

TECHNICAL FIELD

The present invention relates to a control system including a terminal that runs a web browser, and an information processing device to which a device is connected and which can connect to the terminal, and relates to the information processing device.

BACKGROUND

Control systems (POS systems) that have an information processing device (POS terminal) to which a barcode scanner is connected as a device, and a terminal (POS controller) connected to the information processing device, and execute processes by the cooperation of these devices are known from the literature (see, for example, PTL 1).

CITATION LIST

Patent Literature

[PTL 1] JP-A-H05-73769

SUMMARY OF INVENTION

Technical Problem

In the control system disclosed in PTL 1, the terminal accesses an application on a specific server and controls the information processing device by a function of a web browser without an application for controlling the information processing device being installed on the terminal, and anticipates a control system that uses a device connected to the information processing device. In such a control system, each of plural terminals can use a device connected to the information processing device through a function of a web browser, but because each of the plural terminals can use a single device, a state in which the device can be appropriately used by each terminal is required.

The present invention is direction to the foregoing problem, and an object of the present invention is to enable each terminal to use the device appropriately in a control system that includes a terminal that runs a web browser and an information processing device to which a device is connected, and is configured so that each of plural terminals can use a single device.

Solution to Problem

To achieve the foregoing object, the invention comprises a terminal that runs a web browser; a device that outputs data input to the web browser, or to which data output from the web browser is input; and an information processing device including a device communication unit that communicates with the device data output from the device or data input to the device, a terminal communication unit that communicates with the terminal data output from the device or data input to the device, and a device management unit that manages the relationship between the terminal and the device.

Because the terminal and device are related, and the device and the terminal that is using the device are managed, by the device management unit of the information processing device in the control system in this configuration of the invention, events such as information related to the device being mistakenly sent to a terminal other than the terminal that is using the device being managed can be prevented. More specifically, in a control system having a terminal that runs a web browser and an information processing device to which a device is connected configured so that each of plural terminals can use a specific device, the device can be used appropriately by each of the terminals.

The invention is also characterized by the device management unit of the information processing device storing data relating information indicating the device and information indicating the terminal that communicates data output from the device or data input to the device.

In this configuration of the invention, the information processing device can appropriately manage which terminal is using a device by storing data relating information identifying the device and information identifying the terminal that is communicating data output from the device or data input to the device, that is, the terminal that is using the device.

The invention is further characterized by having a second terminal that runs a web browser; and the device management unit of the information processing device preventing the second terminal from communicating data output from the device or data input to the device when the terminal is communicating data output from the device or data input to the device.

If one device is used simultaneously by plural terminals, control-related errors, such as information that should be output to one terminal being output to another terminal, can occur. However, control-related errors caused by plural terminals simultaneously using one device can be effectively suppressed by this configuration of the invention because when the terminal is communicating data output from the device or data input to the device, the device management unit of the information processing device in the control system prevents communication between a second terminal and the device, and maintains exclusive use of the device by the terminal.

Furthermore, the invention is the control system described in claim 3 wherein the second terminal outputs a signal requesting use of the device; and the device management unit of the information processing device does not accept a request for use of the device by the second terminal when the second terminal outputs the signal while the terminal is communicating data output from the device or data input to the device.

In this configuration of the invention, when the terminal is communicating data output from the device or data input to the device and there is a request to use the device from a second terminal other than the terminal, the device management unit of the information processing device in the control system does not accept the request and can therefore reliably maintain a state in which the device is used exclusively by the terminal.

To achieve the foregoing object, the invention is further characterized by having a device communication unit that communicates with a device data output from the device or data input to the device; a terminal communication unit that communicates with a terminal data output from the device or data input to the device; and a device management unit that manages the relationship between the terminal and the device.

Because the terminal and device are related, and the device and the terminal that is using the device are managed, by the device management unit of the information processing device in the control system in this configuration of the invention, events such as information related to the device being mistakenly sent to a terminal other than the terminal that is using the device being managed can be prevented. More specifically, in a control system having a terminal that runs a web browser and an information processing device to which a device is connected configured so that each of plural terminals can use a specific device, the device can be used appropriately by each of the terminals.

Also in the invention, the device management unit stores data relating information indicating the device and information indicating the terminal that communicates data output from the device or data input to the device.

In this configuration of the invention, the information processing device can appropriately manage which terminal is using a device by storing data relating information identifying the device and information identifying the terminal that is communicating data output from the device or data input to the device, that is, the terminal that is using the device.

The invention is further characterized by the device management unit not accepting the request for use of the device by the second terminal when a signal requesting use of the device output by a second terminal that is different from the terminal is received while communicating data output from the device or data input to the device with the terminal.

In this configuration of the invention, when the terminal is communicating data output from the device or data input to the device and there is a request to use the device from a second terminal other than the terminal, the device management unit of the information processing device in the control system does not accept the request and can therefore reliably maintain a state in which the device is used exclusively by the terminal.

The invention is further characterized by having a print unit that prints print data output from the terminal.

In this configuration of the invention, the information processing device has a printing capability, and a state in which the device can be appropriately used by the terminal can be enabled when the terminal and information processing device work together to print.

In a control system including a plurality of terminals on which web browsers run and an information processing device to which a device is connected, and each of the plural terminals can use one device, the invention enables appropriate use of the device by each terminal.

DESCRIPTION OF EMBODIMENTS

A preferred embodiment of the invention is described below with reference to the accompanying figures.

Figure 1:
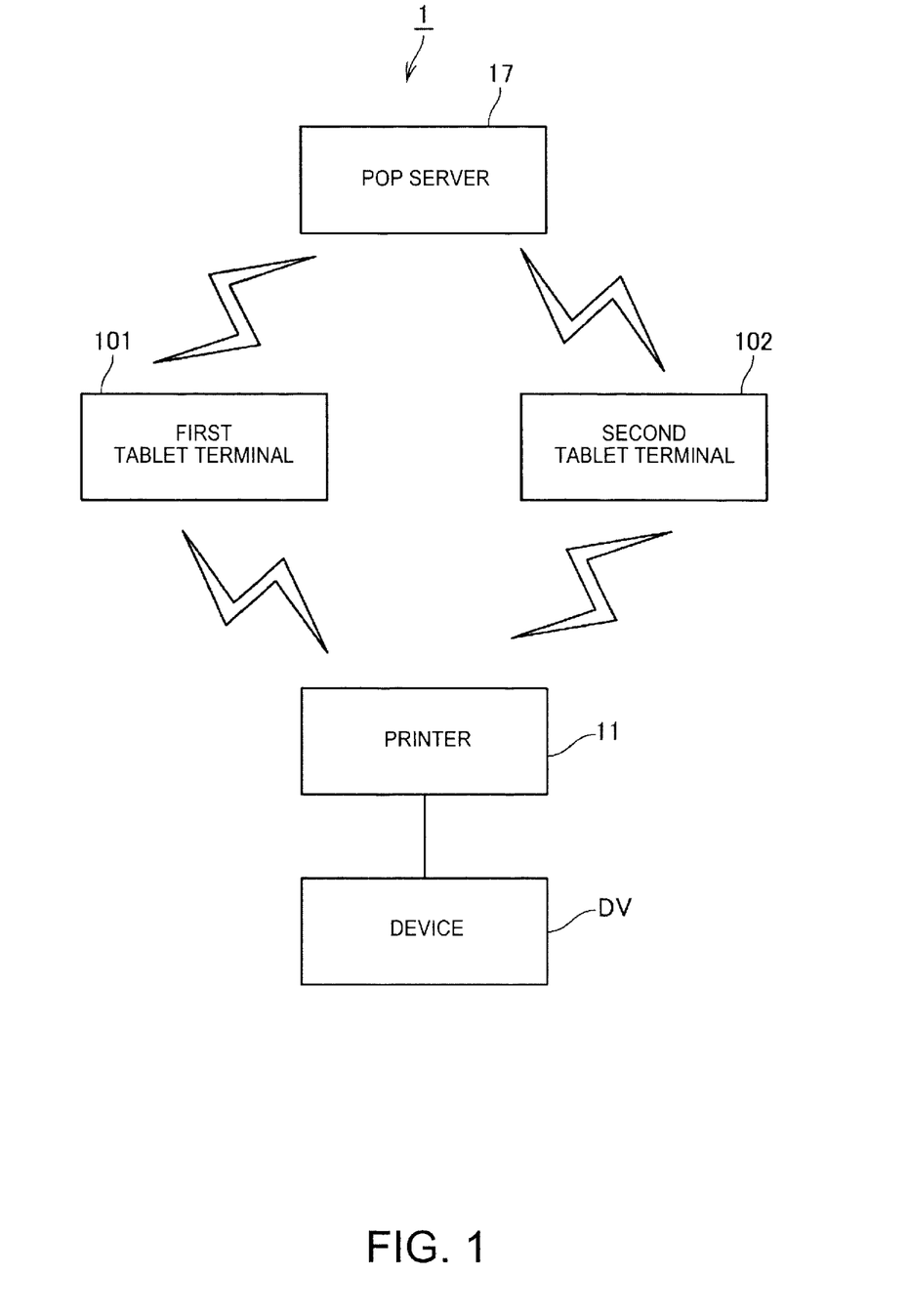
FIG. 1 is a block diagram illustrating the configuration of a control system according to an embodiment of the invention.
Figure 2:
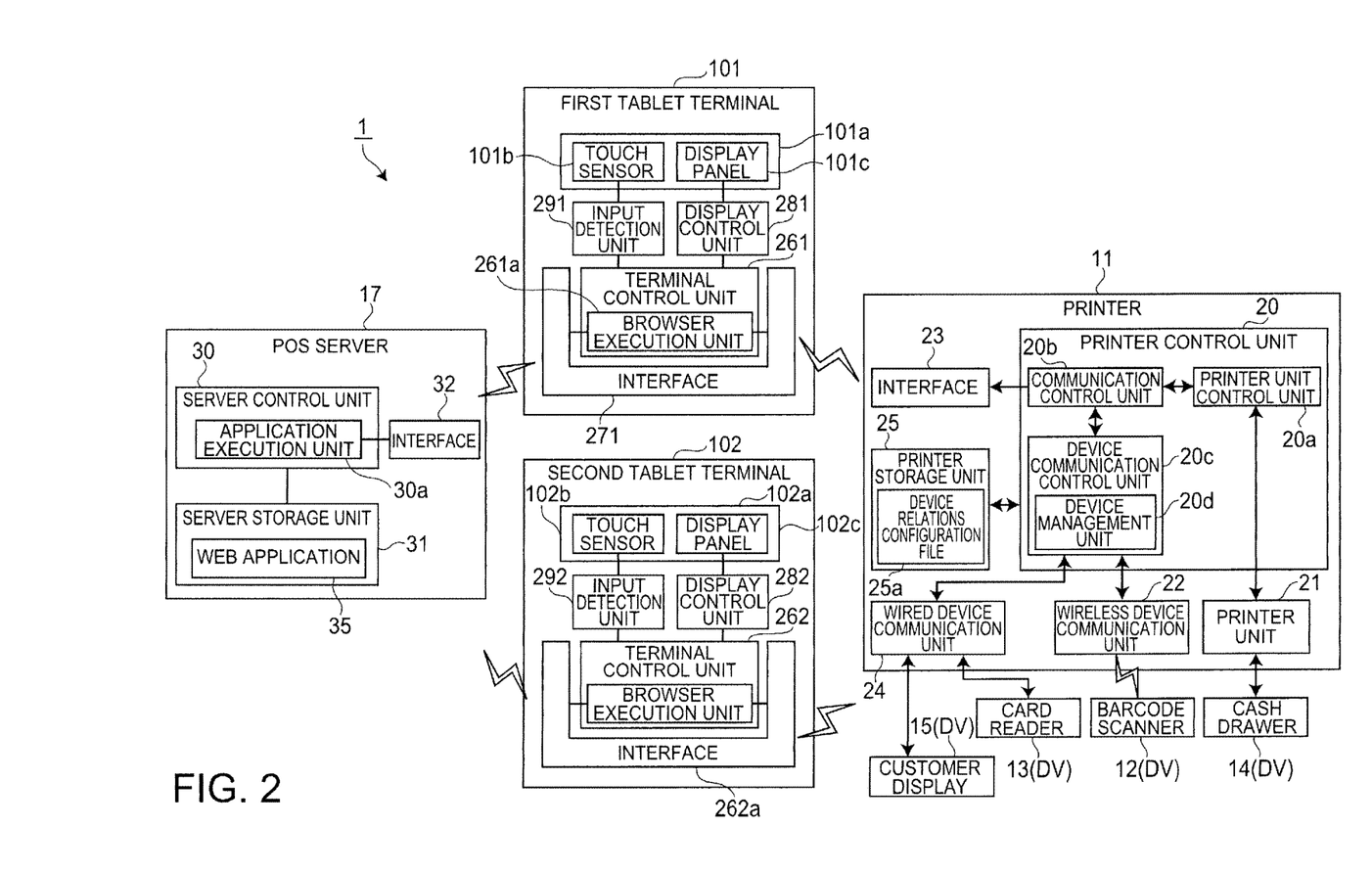
FIG. 2 is a block diagram showing the functional configuration of the control system.

FIG. 1 is a block diagram illustrating the basic configuration of a control system 1 according to this embodiment of the invention. FIG. 2 is a block diagram illustrating the functional configuration of a first tablet terminal 101 (terminal), a second tablet terminal 102 (terminal), a printer 11 (information processing device), and a POS (point of sales) server 17 in the control system 1.

The control system 1 is an example of a POS system that is employed in shopping centers, department stores, convenience stores, and other types of retail stores, restaurants, coffee shops, and other types of stores. Functions of the control system 1 include functions for managing product sales, product inventory, and sales trends in a store; functions for processing transactions for products purchased by customers at checkout counters in a store; and a function for producing receipts for purchase payments by customers.

In this example, there are plural checkout counters where transactions are processed in a store where the control system 1 is employed. At least one printer 11 is installed, and two (plural) terminals, a first tablet terminal 101 and a second tablet terminal 102, can connect to the printer 11, at one checkout counter. More specifically, in this example two checkout clerks can work at one checkout counter, one checkout clerk using the first tablet terminal 101 and the other checkout clerk using the second tablet terminal 102 to perform transaction-related processes and appropriately produce receipts with the printer 11, and use a device DV connected to the printer 11. More specifically, the first tablet terminal 101 and second tablet terminal 102 are in a relationship sharing the printer 11 and a device DV connected to the printer 11.

The printer 11 and the first tablet terminal 101 and second tablet terminal 102 are configured to communicate wirelessly using the Ethernet (T) standard, and the first tablet terminal 101 and second tablet terminal 102 and the POS server 17 are similarly configured to communicate wirelessly using the Ethernet standard. Note that the communication method is not limited to the foregoing, and any method enabling sending and receiving data between devices may be used.

The printer 11 is a thermal printer, and produces receipts based on data input from the first tablet terminal 101 or the second tablet terminal 102.

As shown in FIG. 2, a barcode scanner 12 (device) that reads barcodes from products or product packaging, a card reader 13 (device) that reads credit cards and loyalty cards, for example, a cash drawer 14 that holds paper currency, coins, checks and gift certificates, for example, and a customer display 15 (device) for displaying transaction-related information are connected to the printer 11. The card reader 13 may be a device that reads magnetic information from magnetic stripe cards, or a device that reads and writes to IC cards. The barcode scanner 12 connects to the printer 11 by a near-field communication standard such as Bluetooth (T). The card reader 13 and the customer display 15 connect to the printer 11 through a wired communication interface such as USB. The cash drawer 14 connects to the printer 11 by a wired communication interface conforming to a specific serial communication standard.

These devices DV are examples of devices that output data input to a web browser (browser execution unit 261a) that runs on a terminal (first tablet terminal 101), or to which data output from a web browser is input.

The printer 11 includes a printer control unit 20, a printer unit 21 (print unit), a wireless device communication unit 22, a wired device communication unit 24, an interface 23 (interface), and a printer storage unit 25.

The printer control unit 20 controls parts of the printer 11, and includes a CPU, ROM, RAM, and other peripheral circuits. The printer control unit 20 includes a printer unit control unit 20a that controls the printer unit 21 (described below), a communication control unit 20b that runs a program related to communication control and controls communication between the first tablet terminal 101 and the second tablet terminal 102, and a device communication control unit 20c that runs a program related to device DV control, communicates with the devices DV, and controls the devices DV. The device communication control unit 20c has a device management unit 20d, which is described further below. The program related to controlling the communication described above and the program related to control of the device DV are produced using a dedicated API (application program interface) provided by the manufacturer of the printer 11, for example.

The printer unit 21 includes control circuit that controls printing-related operation, a conveyance mechanism that conveys roll paper, a print mechanism that prints text and images on roll paper with a thermal head, and a cutter mechanism that cuts the roll paper, and produces receipts by printing images related to the receipt on the roll paper and then cutting the roll paper as controlled by the printer unit control unit 20a. The cash drawer 14 is connected to the printer 11 to communicate according to a specific serial communication protocol. The printer unit 21 appropriately controls the cash drawer 14 to open the drawer disposed to the cash drawer 14, for example, as controlled by the printer unit control unit 20a.

The wireless device communication unit 22 communicates wirelessly with the barcode scanner 12 using near-field communication conforming to the Bluetooth (T) standard, and includes a relation manager, a relation controller, a high frequency circuit, and an antenna. The device communication control unit 20c, which is one function block of the printer control unit 20, controls the wireless device communication unit 22 and communicates with the barcode scanner 12 by near-field communication using the Bluetooth standard by reading and running a Bluetooth Driver Stack to control Bluetooth hardware.

The wired device communication unit 24 has a network interface card, for example, connected to a physical port and communicates with the card reader 13 and the customer display 15 according to a specific communication protocol such as USB. The device communication control unit 20c, which is one function block of the printer control unit 20, controls the wired device communication unit 24, and exchanges data and signals with the card reader 13 and customer display 15. In this embodiment of the invention, the device communication control unit 20c, the wired device communication unit 24, and the wireless device communication unit 22 work together and function as a device communication unit that exchanges data output from a device or data input to a device with the device.

The interface 23 sends and receives data according to an Ethernet standard for wireless communication with the first tablet terminal 101 as controlled by the communication control unit 20b. In this embodiment of the invention, the interface 23 and the communication control unit 20b work together to function as a terminal communication unit that exchanges data output from a device or data input to a device with a terminal.

The printer storage unit 25 includes nonvolatile memory such as EEPROM, and nonvolatilely stores data rewritably. A device relations configuration file 25a as described further below is stored in the printer storage unit 25.

The first tablet terminal 101 includes a terminal control unit 261, a terminal interface 271, a display control unit 281, an input detection unit 291, and a touch panel 101a.

The touch panel 101a includes a display panel 101c disposed to the front of the first tablet terminal 101, and a touch sensor 101b integrally disposed on the surface of the display panel 101c. The display panel 101c may be an LCD panel, an OLED panel, e-paper, or other type of display, and is driven by the display control unit 281. The touch sensor 101b is a capacitive or pressure-sensitive sensor, detects touch operations by the user's finger, stylus, or similar device, and outputs a signal indicating the position where the operation was detected to the input detection unit 291.

The display control unit 281 drives the display panel 101c based on display data input from the first browser execution unit 261a described below, and displays a window containing text or images on the display panel 101c.

The input detection unit 291 detects touch operations on the touch panel 101a based on the signals output by the touch sensor 101b. When an operation is detected, the input detection unit 291 generates coordinate data expressing the position of the detected operation in coordinates corresponding to the display position on the display panel 101c, and outputs to the first browser execution unit 261a.

The terminal control unit 261 controls the parts of the first tablet terminal 101, and includes a CPU, ROM, RAM, and other peripheral circuits. The terminal control unit 261 includes a browser execution unit 261a that renders web browser functions by running a browser program. The browser execution unit 261a functions as a web browser by running the browser program.

The browser execution unit 261a downloads a web page written in HTML or other markup language or scripting language from the POS server 17 using a function of a web browser. The downloaded web page data is stored in RAM not shown, for example. The browser execution unit 261a reads the downloaded web page data, generates display data for displaying the web page, and outputs to the display control unit 281 by functions of the web browser. The browser execution unit 261a independently or in conjunction with the application execution unit 30a of the POS server 17 executes processes by functions of the scripts embedded in the web page.

When a touch operation on the touch sensor 101b is detected by the input detection unit 291, the browser execution unit 261a determines the input content based on the coordinate data input by the input detection unit 291 according to the touch operation, and the display image data output to the display control unit 281. Based on the identified input content, the browser execution unit 261a executes an appropriate process by a script function, and outputs data indicating the identified input content to the POS server 17. The application execution unit 30a executes processes based on the input data. The browser execution unit 261a receives data resulting from the application execution unit 30a running an application program from the POS server 17, generates display data reflecting the received data, and outputs to the display control unit 281.

The terminal interface 271 communicates with the printer 11 and the POS server 17 according to a specific wireless communication standard as controlled by the terminal control unit 261.

Like the first tablet terminal 101, the second tablet terminal 102 includes a terminal control unit 262, a terminal interface 272, a display control unit 282, an input detection unit 292, and a touch panel 102a. The configuration of the second tablet terminal 102 is identical to that of the first tablet terminal 101, and further detailed description thereof is omitted.

Below, the first tablet terminal 101 and second tablet terminal 102 are generically referred to appropriately as terminals.

The POS server 17 includes a server storage unit 31 that stores a database storing product-related information, a database for managing sales, and a database for managing inventory, and uses these databases to manage the control system 1.

The POS server 17 also has a server control unit 30, a server storage unit 31, and a server interface 32.

The server control unit 30 controls parts of the POS server 17, and includes a CPU, ROM, RAM, and other peripheral circuits. The server storage unit 31 includes a nonvolatile storage device such as a hard disk or EEPROM or other nonvolatile memory, and stores data rewritably. The server interface 32 communicates according to a wireless Ethernet standard with the first tablet terminal 101 and second tablet terminal 102 as controlled by the server control unit 30.

An application 35 is stored in the server storage unit 31 so that the application 35 can be loaded. The application execution unit 30a of the server control unit 30 is a function block that runs an application 35 that generates a web page.

The application execution unit 30a generates, or reads from the server storage unit 31, the data for the web page requested by the first tablet terminal 101 or the second tablet terminal 102, and sends the data to the terminal that sent the request. When transaction process data is sent from the first tablet terminal 101 or the second tablet terminal 102, the application execution unit 30a receives the data through the server interface 32.

The basic operation when devices of the control system 1 cooperate to execute a transaction-related process is described next. For convenience of description, the first tablet terminal 101 is the device that runs the transaction-related process below.

The first tablet terminal 101 first executes the following processes before running the transaction-related process.

Specifically, the checkout clerk or other worker first starts the browser of the first tablet terminal 101, and commands displaying the user interface U1 on the touch panel 101a. Based on this command, the browser execution unit 261a of the terminal control unit 261 accesses a specific address on the POS server 17, acquires a drawing file such as an HTML file, and displays the user interface U1 based on the drawing file. Embedded in this drawing file is a program written in a specific scripting language with the functions for executing the transaction-related process (described below) in conjunction with the application execution unit 30a of the POS server 17.

Figure 3:
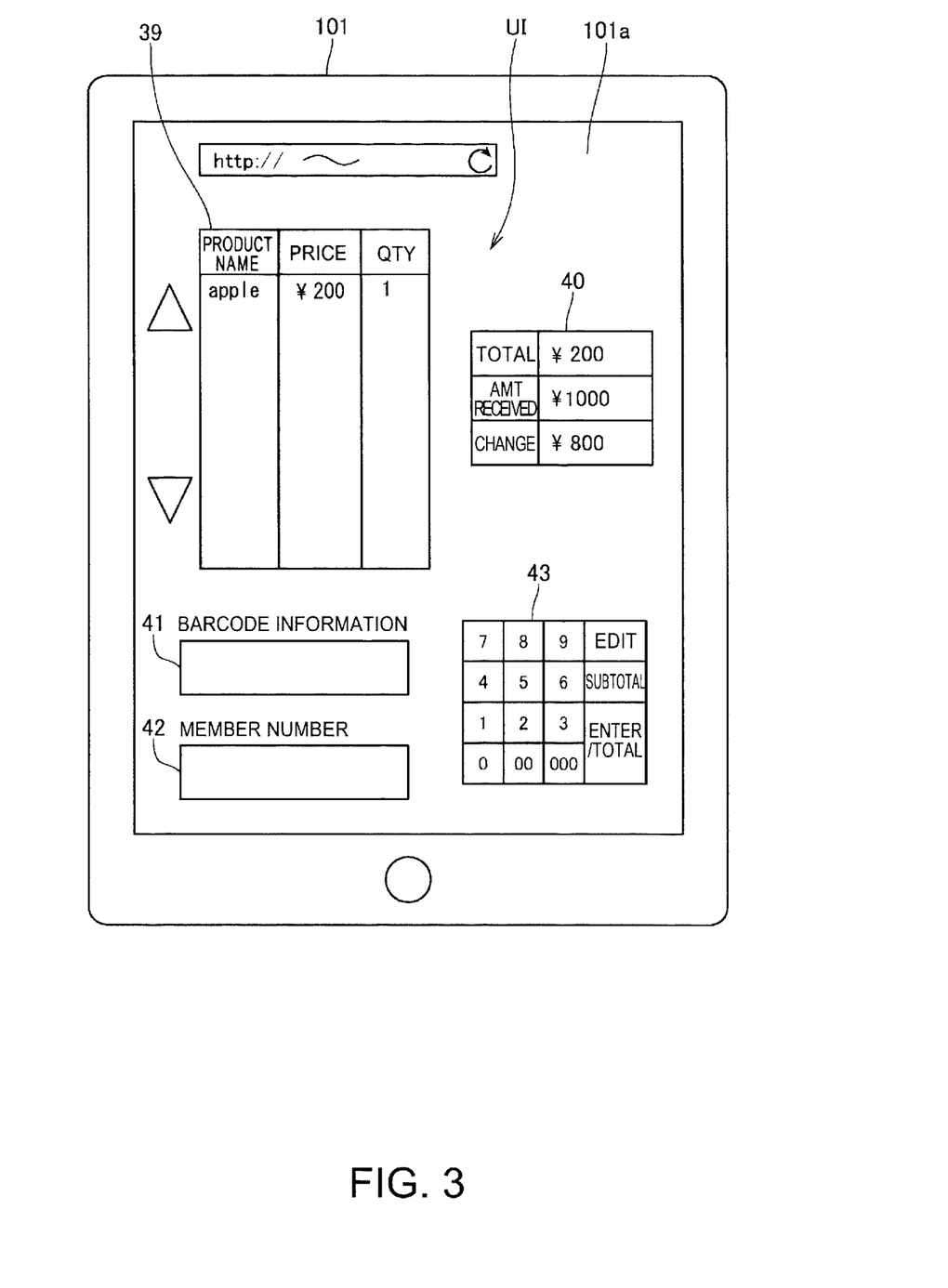
FIG. 3 shows an example of a screen displayed on a terminal.

FIG. 3 shows an example of the user interface U1 presented on the touch panel 101a.

A list display area 39 where the names of the products purchased by the customer, the prices of the products, and the quantities of the products are presented in a list is displayed at the top left of the dedicated user interface U1 in FIG. 3. To the right of this list display area 39 is displayed an amount input field 40, which is a field where the total amount of the products purchased by the customer, the amount of money received from the customer, and the amount of change due to the customer are displayed.

Below the list display area 39 is a barcode information input field 41, which is an input field where the information (referred to below as barcode information) expressed by the barcode that is read by the barcode scanner 12 is input and displayed. The barcode information is basically identification information uniquely assigned to each type of product.

Below the barcode information input field 41 is a customer number input field 42, which is an input field where the customer number acquired by reading a loyalty card with the card reader 13 is input and displayed when a card is read.

A virtual keypad 43 is displayed on the right side of the barcode information input field 41 and the customer number input field 42. Information can be input through the virtual keypad 43 to the various fields presented in the user interface U1, and the virtual keypad 43 includes all keys required to input information.

An address input field 44 where the accessed address is displayed is presented at the top of the user interface U1.

Figures 4A, 4B, 4C:
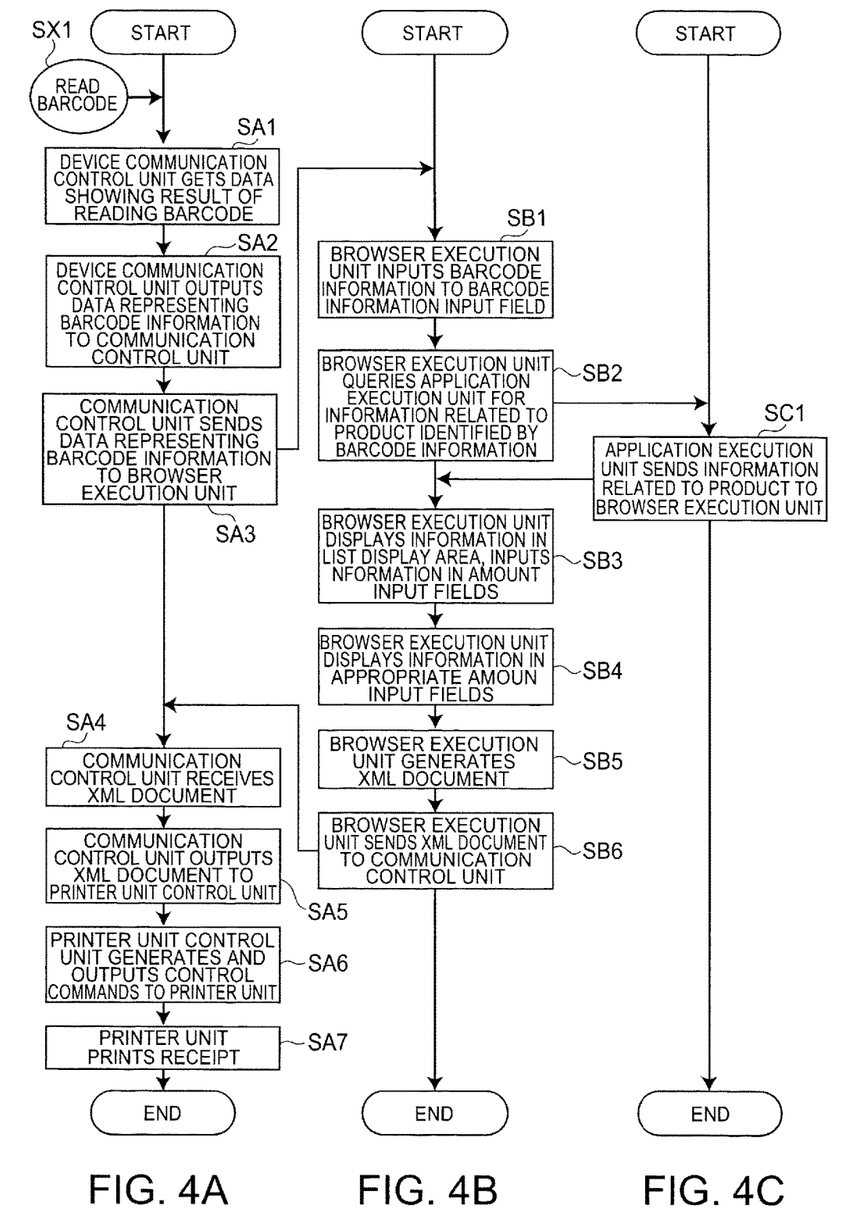
FIG. 4 is a flow chart showing the operation of the control system.

The basic operation of the devices in the control system 1 configured as described above when cooperatively executing the transaction-related process is described below with reference to the flow chart in FIG. 4 using the operation when a customer purchases one product as an example. In FIG. 4, (A) shows the operation of the printer 11, (B) shows the operation of the first tablet terminal 101, and (C) shows the operation of the POS server 17.

At the checkout counter, the checkout clerk first scans the barcode on the one product using the barcode scanner 12 (step SX1).

The device communication control unit 20c of the printer control unit 20 acquires data showing the result of reading by the barcode scanner 12 through the wireless device communication unit 22 (step SA1). Based on the data showing the read result, the device communication control unit 20c also generates data indicating the barcode information, and outputs the data indicating the barcode information to the communication control unit 20b (step SA2). The communication control unit 20b sends the data indicating the barcode information to the browser execution unit 261a of the first tablet terminal 101 according to a specific protocol (step SA3).

When the data indicating the barcode information is input, the browser execution unit 261a of the terminal control unit 261 of the first tablet terminal 101 inputs the barcode information to the barcode information input field 41 by a function of the program (referred to below as a "script") embedded in the HTML file related to the dedicated user interface U1 (step SB1). Next, by a function of the script, the browser execution unit 261a communicates with the application execution unit 30a of the POS server 17, and requests the product name and price of the product indicated by the barcode information (step SB2). The application execution unit 30a that received the request appropriately accesses the appropriate database by a function of the application 35, acquires the required information, and outputs the acquired information to the browser execution unit 261a of the first tablet terminal 101 (step SC1).

The browser execution unit 261a of the first tablet terminal 101 displays the name of the product the customer purchased, the price of the product, and the quantity of the product in the list display area 39, and displays the total amount of the product the customer purchased in the specific field of the amount input field 40, by a function of the script (step SB3).

Next, when an operation finalizing the purchase transaction is executed by the checkout clerk through the virtual keypad 43, payment is received from the customer and change is made, and the browser execution unit 261a communicates appropriately with the application execution unit 30a using a function of the script, and displays the appropriate information in the appropriate areas of the amount input field 40 accordingly (step SB4).

Next, by a function of the script, the browser execution unit 261*a* generates an XML document (print data) containing information related to the receipt to be produced by the printer unit 21 (step SB5). Included in the XML document is the information required to produce a receipt, such as information about the text and images to be printed on the receipt, in an XML-compliant format.

Next, the browser execution unit 261*a* sends the generated XML document to the communication control unit 20*b* of the printer 11 according to a specific protocol (step SB6).

When the XML document is sent by the browser execution unit 261*a*, the communication control unit 20*b* of the printer 11 receives the XML document (step SA4) and outputs to the printer unit control unit 20*a* (step SA5).

The printer unit control unit 20*a* generates and outputs to the printer unit 21 control commands that are control commands conforming to the command language of the printer unit 21 based on the input XML document and cause the printer unit 21 to execute the processes related to producing a receipt (step SA6). The control circuit of the printer unit 21 then controls the related mechanisms and produces a receipt based on the control commands (step SA7).

The control system 1 according to this embodiment is configured so that two terminals (first tablet terminal 101 and second tablet terminal 102) that run web browsers can connect to one printer 11. Each terminal can use a device DV connected to the printer 11. For example, each terminal can acquire data based on the result of reading with a barcode scanner 12, and can output specific data to and present a specific display on a customer display 15.

As a result, the condition described below occurs.

Specifically, of the first tablet terminal 101 and second tablet terminal 102, the first tablet terminal 101 executes the transaction-related process shown in the flow chart in FIG. 4 in this example. In this event, when data representing the barcode information is sent from the communication control unit 20*b* of the printer 11 in step SA3 in FIG. 4, the data must be sent to the first tablet terminal 101 and not sent to the second tablet terminal 102. This is because the data representing the barcode information is not data that the second tablet terminal 102 should receive, and if the data is sent to the second tablet terminal 102, some kind of wrong process may be executed by the second tablet terminal 102 and the required process may not be executed by the first tablet terminal 101.

Therefore, because plural terminals can each use one device, the device can be used appropriately by each terminal as a result of the printer 11 according to this embodiment executing the following process.

Figure 5:
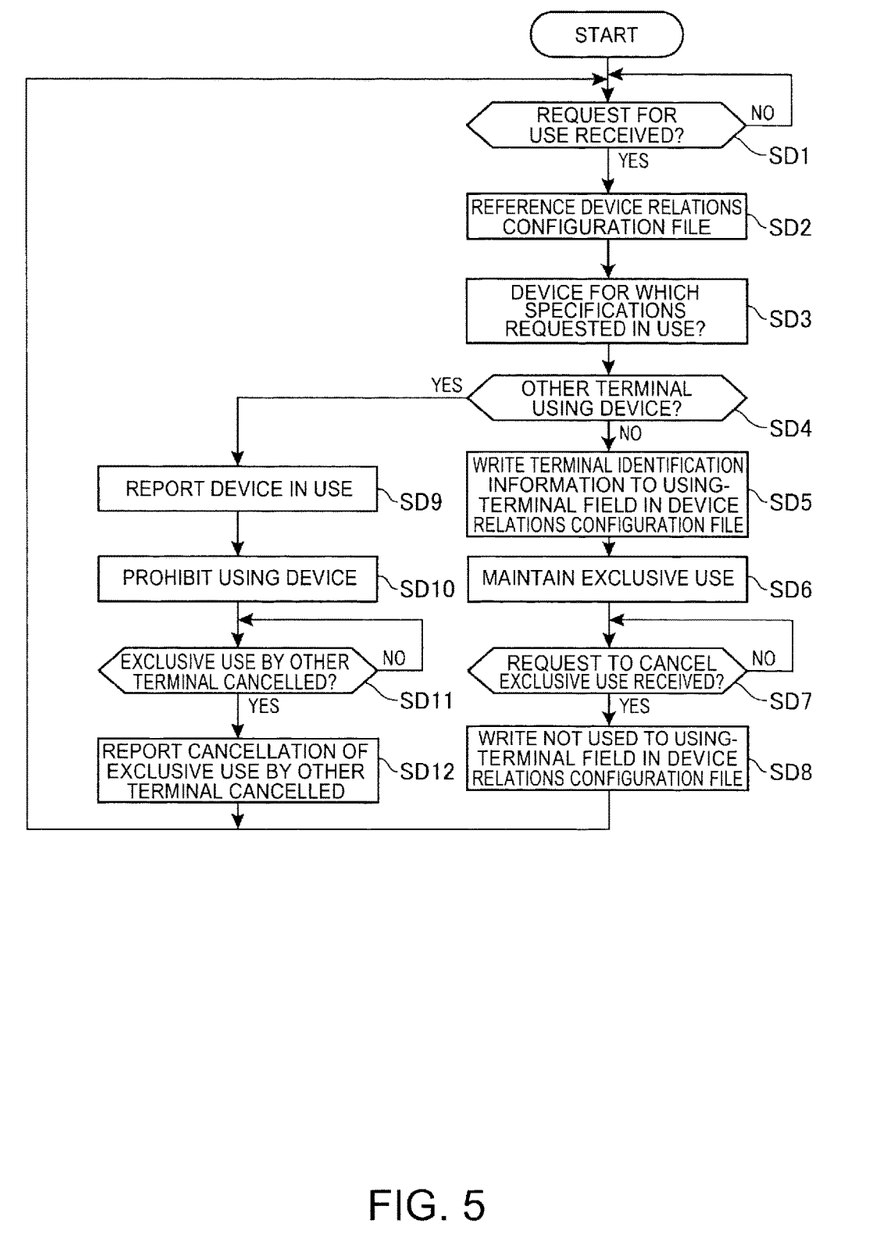
FIG. 5 is a flow chart showing the operation of a printer.

FIG. 5 is a flow chart illustrating the operation of the printer 11.

In the following description, the first tablet terminal 101 (second tablet terminal 102) using a device DV connected to the printer 11 means that a terminal communicates data output from a device or data input to a device (receives data based on an output value of the device DV, or causes a device DV to execute a specific process), including, for example, the first tablet terminal 101 (second tablet terminal 102) receiving data based on the result of reading by the barcode scanner 12, receiving data based on the result of reading by the card reader 13, or outputting data to the customer display 15 for a specific display.

A device name, which is a unique value, is individually assigned to the customer display 15, card reader 13, barcode scanner 12, and cash drawer 14, which are devices DV connected to the printer 11. The assigned device name is used as identification information identifying the particular device DV in software processes of the control system 1. The browser execution units of the first tablet terminal 101 and second tablet terminal 102 are configured to report the name of the device DV to use to the printer 11 and request use of the device DV by a function of a script in order to use a device DV connected to the printer 11. For example, when the first tablet terminal 101 runs the transaction-related process shown in the flow chart in FIG. 4, the browser execution unit 261*a* of the first tablet terminal 101 generates and sends data containing information including the device name assigned to the barcode scanner 12 and a request to use the barcode scanner 12 written in a specific format to the printer 11 in order to use the barcode scanner 12.

Referring to FIG. 5, the device management unit 20*d* of the device communication control unit 20*c* of the printer 11 checks whether or not a signal requesting use of a device DV is input from the browser execution unit 261*a* of the first tablet terminal 101 or the browser execution unit 262*a* of the second tablet terminal 102 (step SD1). As described above, the device name assigned to the requested device DV is specified when requesting use of a device DV.

Note that the data the browser execution unit 261*a*, 262*a* outputs to the printer 11 is output through the communication control unit 20*b* to the device management unit 20*d* of the device communication control unit 20*c*, and based on the input data, the device management unit 20*d* makes the decision in step SD1 or step SD7 described below.

If a signal requesting use of a device DV is input from the browser execution unit of any terminal (step SD1 returns YES), the device management unit 20*d* references the device relations configuration file 25*a* stored in the printer storage unit 25 (step SD2).

Figure 6:
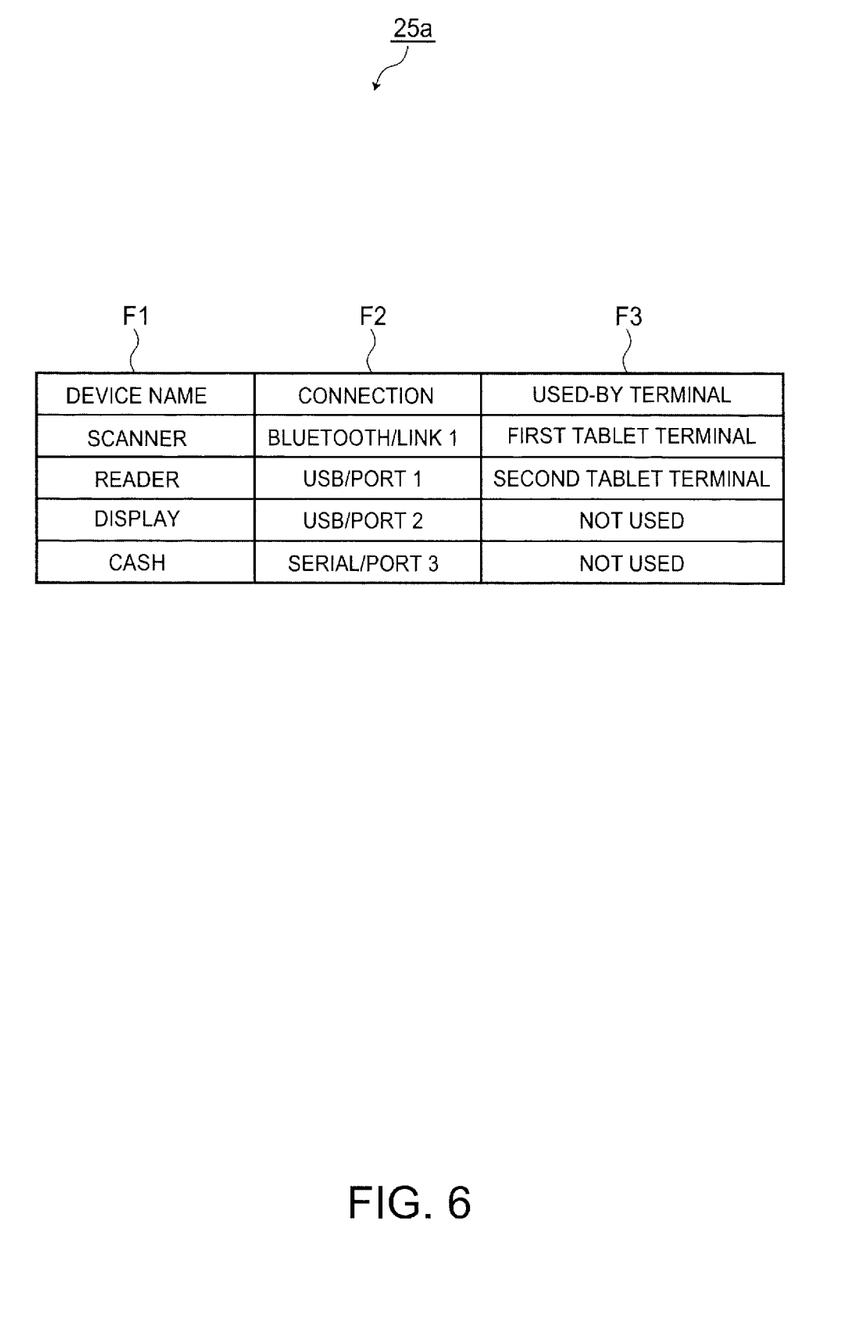
FIG. 6 illustrates the content of a device relations configuration file.

FIG. 6 schematically shows an example of part of the content of the device relations configuration file 25*a* in a format useful for description.

Note that in the following description, "scanner" is assigned as the device name to the barcode scanner 12, "reader" is assigned as the device name to the card reader 13, "display" is assigned as the device name to the customer display 15, and "cash" is assigned as the device name to the cash drawer 14.

As shown in FIG. 6, the device relations configuration file 25*a* relationally stores the device name (information identifying the device), information identifying where the device DV is connected (meaning the connection port or the communication link in this embodiment of the invention), and information identifying the terminal using the device DV, for each device DV connected to the printer 11.

In this example, the device relations configuration file 25*a* has the data structure of a relational database, and one record includes a device name field F1 where the device name is stored, a connection field F2 where information indicating where the device DV is connected is stored, and a used-by terminal field F3 where information identifying the terminal that is using the device DV is stored.

As described further below, when either one of the first tablet terminal 101 and the second tablet terminal 102 is using one device DV, this embodiment of the invention is configured to maintain a state in which that one device DV is used exclusively by that one terminal and that one device DV cannot be used by another terminal. Information identifying the terminal that is using the related device DV, or information indicating that the device DV is not being used, is stored in the used-by terminal field F3. For example, when the related device DV is used exclusively by the first tablet terminal 101, information identifying the first tablet terminal 101 is stored in the used-by terminal field F3 of that device DV, and when the related device DV is not being used by any terminal, information indicating the same (shown as NOT USED in the example in FIG. 6) is stored in the used-by terminal field F3.

The device relations configuration file 25a is therefore data relating information identifying a device and information identifying the terminal that communicates the data output from the device or the data input to the device.

Returning to FIG. 5, the device management unit 20d references the device relations configuration file 25a (step SD2), and determines whether or not the device DV requested for use in step SD1 is already being used exclusively by a terminal other than the terminal that requested use (step SD3).

For example, assume that a request to use the barcode scanner 12 is received from the first tablet terminal 101 in step SD1. In this event, the device management unit 20d references the used-by terminal field F3 in the corresponding record of the device relations configuration file 25a. If information identifying the second tablet terminal 102 is stored in this field, the device management unit 20d determines that the barcode scanner 12 is being used by a terminal other than the terminal that requested use. However, if information indicating that the device is not in use is stored in the field, the device management unit 20d determines that the barcode scanner 12 is not being used by a terminal other than the terminal that requested use.

If the result of the decision in step SD3 is that the device DV requested for use in step SD1 is not being used by a terminal other than the terminal that requested use (step SD4 returns NO), the device management unit 20d writes information identifying the terminal that requested use of the device DV in step SD1 to the used-by terminal field F3 of the corresponding record in the device relations configuration file 25a (step SD5). For example, if the request came from the first tablet terminal 101, information identifying the first tablet terminal 101 is written to the related used-by terminal field F3.

Next, the device management unit 20d maintains a state in which the device DV is used exclusively by the terminal that requested use of that device DV in step SD1 (step SD6). Exclusive use of the device DV by this terminal is achieved by prohibiting use of the device by another terminal when a request to use the device DV is received from another terminal as described below.

Next, the device management unit 20d checks if there is a request to cancel exclusive use from the terminal using the device DV (step SD7). When using one device and then stopping use of that one device, the browser execution unit 261a of the first tablet terminal 101 and the browser execution unit 262a of the second tablet terminal 102 in this embodiment of the invention are configured to report cancelling exclusive use of the one device to the printer 11 by a function of a dedicated script.

When there is a request to cancel exclusive use, the device management unit 20d writes information indicating that the device DV is not used in the used-by terminal field F3 of the corresponding record in the device relations configuration file 25a (step SD8), and then goes to step SD1. Exclusive use of a device DV by a terminal is thereby cancelled.

However, if in step SD4 it is determined that the device DV requested for use in step SD1 is being used by a terminal other than the terminal that requested use (step SD4 returns YES), the device management unit 20d reports to the terminal that requested use that the device DV requested for use is being used according to a specific protocol (step SD9), and prohibits use of the device DV by that terminal (step SD10). More specifically, the request for use of the device by the terminal that requested use is not accepted. By thus not accepting a request for use when one terminal is using one device DV, in other words, when one terminal is communicating data output from one device DV or data input to the device, the printer 11 does not enable another terminal to communicate data output from the device or data input to the device.

Next, the device management unit 20d checks whether or not exclusive use by a terminal other than the terminal that requested use was cancelled (step SD11). More specifically, the device management unit 20d references the device relations configuration file 25a as needed, and determines exclusive use was cancelled by a terminal other than the terminal that requested use if the information stored in the used-by terminal field F3 of the record related to the device DV for which use was requested in step SD1 is information indicating the device is not being used.

If exclusive use was cancelled by a terminal other than the terminal that requested use of the device DV (step SD11 returns YES), the device management unit 20d reports the same to the browser execution unit of the terminal that requested use (step SD12), and then goes to step SD1. This report enables the browser execution unit of the terminal that requested use to know that exclusive use of the device DV by another terminal was cancelled, and based on knowing this can request use of the device DV again and be able to use the device DV.

As described above, the control system 1 according to this embodiment has a plurality of terminals (first tablet terminal 101 and second tablet terminal 102) on which a web browser runs; and a printer 11 (information processing device) that can communicate with the plural terminals and to which plural devices DV (barcode scanner 12, card reader 13, cash drawer 14, and customer display 15) are connected. Both the first tablet terminal 101 and second tablet terminal 102 are also configured to be able to use devices DV connected to the printer 11 by a function of the web browser. The printer 11 also has a device management unit 20d that manages which terminal is using each device DV.

Thus configured, because the devices DV and the terminals using the devices DV are managed by the device management unit 20d of the printer 11 in the control system 1, situations such as information related to a device DV being managed, such as the result of reading by a barcode scanner 12, being mistakenly sent to a terminal other than the terminal that is using the device DV can be prevented. More specifically, in a control system 1 having a plurality of terminals that run a web browser and a printer 11 to which a device DV is connected, each of the plural terminals can use one device DV while appropriate use of the device DV by each terminal can be enabled.

In this embodiment of the invention, the device management unit 20d can manage which terminal is using a device DV by storing (saving) a device name (information identifying a device) relationally to information identifying the terminal controlling the device in a device relations configuration file 25a.

With this configuration, which terminal is using a device DV can be appropriately managed using the device relations configuration file 25a.

Furthermore, while managing which one of plural connectable terminals is controlling a device DV, the device management unit 20d can maintain a state in which the device DV is exclusively controlled by the one terminal. In other words, when one terminal is communicating data output from a device or the data input to a device, the device management unit 20*d* prevents another terminal from communicating with that device.

Because the device management unit 20*d* of the printer 11 in the control system 1 in this configuration maintains a state in which the device DV is used exclusively by the one terminal when managing which one terminal of plural terminals is using a device DV, the device management unit 20*d* can effectively suppress control-related errors resulting from plural terminals using one device DV.

Furthermore, when managing which one terminal of plural terminals is controlling a device DV and there is a request to control the device DV from another terminal other than the one terminal, the device management unit 20*d* in this embodiment of the invention can maintain a state of exclusive use of the device DV by the one terminal by prohibiting control of the device DV by another terminal.

This configuration enables reliably maintaining a state in which the device is used exclusively by the one terminal.

The invention is described above with reference to a preferred embodiment thereof, but the invention is not limited thereto and can be modified and adapted in many ways without departing from the scope of the accompanying claims.

For example, the foregoing embodiment describes an example in which one printer 11 is shared at a checkout counter, but how the control system 1 is used is not limited to this example, and the control system 1 can also be used in a café or other type of restaurant where each of the service staff has their own terminal, share a printer 11, and appropriately execute printing processes as required.

Further alternatively, the printer 11 and the POS server 17 are separate devices above, but the function of the POS server 17 may be rendered in the printer 11.

Yet further, the printer 11 is a thermal printer above, but any recording method may be used.

Yet further, the function blocks shown in FIG. 2 can be desirably embodied by the cooperation of hardware and software, and do not suggest a specific hardware configuration. Furthermore, the devices may execute the operations by running a program stored on an externally connected storage medium.

INDUSTRIAL APPLICABILITY

As described above, the invention is useful in a POS terminal to which a barcode scanner or other device is connected, and to a POS system that uses a POS terminal, and can be used in a POS system or other information processing device, and an information processing system.

REFERENCE SIGNS LIST

1 control system
11 printer (information processing device)
12 barcode scanner (device)
13 card reader (device)
14 cash drawer (device)
15 customer display (device)
20 printer control unit
20*a* printer unit control unit
20*b* communication control unit (terminal communication unit)
20*c* device communication control unit (device communication unit)
20*d* device management unit
21 printer unit
22 wireless device communication unit (device communication unit)
23 interface (terminal communication unit)
24 wired device communication unit (device communication unit)
25 printer storage unit
25*a* device relations configuration file
101 first tablet terminal 101 (terminal)
102 second tablet terminal (terminal)
261*a* browser execution unit
262*a* browser execution unit

The invention claimed is:

1. A control system comprising:
    a first terminal configured to run a web browser and execute a transaction-related process;
    a second terminal configured to run a web browser and execute a transaction-related process;
    a printer communicatively connected to the first terminal and the second terminal; and
    a device communicatively connected to the printer, the device configured to communicate, through the printer, data output from the first and second terminals or data to be input to the first and second terminals,
    wherein:
    the printer is an intermediary between the device and the first and second terminals, and
    the printer comprises:
    a terminal communicator configured to communicate with the first and second terminals,
    a device communicator configured to communicate with the device,
    a print mechanism configured to print based on print data output from the first or second terminal, and
    a device manager configured to maintain, when the first terminal is communicating data with the device and executing the transaction-related process, an exclusive state in which the device is exclusively used by the first terminal, by preventing the second terminal from communicating data with the device,
    wherein the device manager is further configured such that, when the device manager is in the exclusive state, the device manager is configured to receive a cancellation request from the first terminal to cancel the exclusive state, and to cancel the exclusive state upon receipt of said cancellation request.

2. The control system of claim 1, wherein the device manager of the printer is configured to store information indicating the device and information indicating the first or second terminal that communicates data with the device.

3. The control system of claim 1, wherein
    the second terminal is configured to output a signal requesting use of the device; and
    the device manager of the printer is configured not to accept a request for use of the device from the second terminal when the second terminal outputs the signal while the first terminal is communicating data with the device.

4. A printer being an intermediately between a device and first and second terminals, the printer being configured to transmit data from the device to the first and second terminals or to transmit data from the first and second terminals to the device, the printer comprising:
    a terminal communicator configured to communicate with the first and second terminals that are each configured to run a web browser and execute a transaction-related process, a device communicator configured to communicate with the device, a print mechanism configured to print based on print data output from the first or second terminal, and a device manager configured to maintain, when the first terminal is communicating data with the device and executing the transaction-related process, an exclusive state in which the device is exclusively used by the first terminal, by preventing the second terminal from communicating data with the device, wherein the device manager is configured such that, when the device manager is in the exclusive state, the device manager is configured to receive a cancellation request from the first terminal to cancel the exclusive state, and to cancel the exclusive state upon receipt of said cancellation request.

5. The printer of claim 4, wherein the device manager is configured to store information indicating the device and information indicating the first or second terminal that communicates data with the device.

6. The printer of claim 4, wherein when a signal requesting use of the device output by the second terminal is received while communicating data between the device and the first terminal, the device manager is configured not to accept a request for use of the device by the second terminal.

7. The control system of claim 1, wherein the device manager is configured such that, when the device manager receives a request for use of the device from the second terminal when the first terminal is communicating data with the device, the device manager sends a report to the second terminal indicating that the device is in use.

8. The printer of claim 4, wherein the device manager is configured such that, when the device manager receives a request for use of the device from the second terminal when the first terminal is communicating data with the device, the device manager sends a report to the second terminal indicating that the device is in use.

9. The control system of claim 1, wherein the device manager is configured such that, when the device manager receives the cancellation request and cancels the exclusive state, the device manager sends a report to the second device indicating that the exclusive state has been cancelled.

10. The printer of claim 4, wherein the device manager is configured such that, when the device manager receives the cancellation request and cancels the exclusive state, the device manager sends a report to the second device indicating that the exclusive state has been cancelled.

* * * * *